United States Patent [19]
Okada et al.

[11] Patent Number: 5,862,122
[45] Date of Patent: Jan. 19, 1999

[54] PHASE CHANGE OPTICAL DISK AND A METHOD FOR RECORDING AND PLAYBACKING OPTICAL INFORMATION ON OR FROM AN OPTICAL DISK

[75] Inventors: Mitsuya Okada; Shuichi Ohkubo, both of Tokyo, Japan

[73] Assignee: NEC Corporation, Tokyo, Japan

[21] Appl. No.: 956,781

[22] Filed: Oct. 23, 1997

[30] Foreign Application Priority Data

May 27, 1996 [JP] Japan .................................... 9-136747
Oct. 24, 1996 [JP] Japan .................................... 8-282197

[51] Int. Cl.$^6$ ...................................................... G11B 7/24
[52] U.S. Cl. ........................................ 369/275.2; 430/321
[58] Field of Search .............................. 369/275.2, 275.1, 369/275.4, 272, 278, 279, 280, 287; 428/64.2, 64.4; 430/321, 320

[56] References Cited

U.S. PATENT DOCUMENTS

| | | | |
|---|---|---|---|
| 5,381,395 | 1/1995 | Okada | 369/275.2 |
| 5,493,561 | 2/1996 | Nishiuchi et al. | 369/275.1 |
| 5,646,924 | 7/1997 | Nonoyama et al. | 369/275.1 |

FOREIGN PATENT DOCUMENTS

| | | |
|---|---|---|
| 2-73537 | 3/1990 | Japan . |
| 2-113451 | 4/1990 | Japan . |
| 4-102243 | 4/1992 | Japan . |
| 7-93804 | 4/1995 | Japan . |
| 8-77596 | 3/1996 | Japan . |
| 8-124218 | 5/1996 | Japan . |

OTHER PUBLICATIONS

Ishida et al., High Density Mark Edge Recording on a Phase Change Rewritable Disk by 680nm Laser Diode, pp. 70–75, Nov., 1994.

Ohno et al., High Density Phase Change Optical Disks Using Land & Groove Recording Method, pp. 114–120, Nov., 1993.

*Primary Examiner*—Tan Dinh
*Attorney, Agent, or Firm*—Sughrue, Mion, Zinn, Macpeak & Seas, PLLC

[57] ABSTRACT

The optical phase difference between reflected laser light from the crystalline and the amorphous part of a phase change recording layer is established as 180 degrees ±5 degrees. The ratio between the light absorption factor when the phase change recording film is in the crystalline condition to that when it is in the amorphous condition is set to within the range 0.9 to 1.1. With the wavelength of the laser light used as $\lambda$, the optical depth of a guide groove formed on the substrate is set to within the range $\lambda/9$ to $\lambda/6$. With the wavelength of the laser light used in the range 635 nm to 650 nm, the depth of the guide groove is in the range 40 to 70 nm. In an optical disk such as this, when seen from reflected light, the groove region of a groove during playback and land region of the groove during playback are optically equivalent. For this reason, it is substantially the same as the case in which the optical phase difference between the reflected laser light from the crystalline part of the recording film and the reflected laser light from the amorphous part of the recording film is zero, this making it possible to achieve consistency in the signal levels between land playback and groove playback. As a result, it is possible to perform double track density recording and mark edge recording.

12 Claims, 3 Drawing Sheets

PHASE CHANGE OPTICAL DISK AND A METHOD FOR RECORDING AND PLAYBACKING OPTICAL INFORMATION ON OR FROM AN OPTICAL DISK

BACKGROUND OF THE INVENTION

1. Field of the Invention

The present invention relates to an optical information storage medium which exhibits a structural change between crystalline and amorphous structure and a change in optical properties in accordance with the thermal history of temperature rise and cooling by being subjected to laser light, this being known as a phase change optical disk.

2. Description of Related Art

An optical disk recording method which uses a laser beam is capable of high-capacity recording and, because of the non-contact nature and high speed of this method, progress is being made in practical use of this method as large-capacity memory.

Optical disks can be classified into three types: read-only type disks such as those known as Compact Discs and laser discs, "write once" type disks which can be appended to by a user, and rewritable disks which can be recorded and erased repeatedly. Write many and rewritable optical disks are used as external memory for computers, and as storage for document or image files.

There are two types of rewritable disks: a phase change type optical disk which makes use of a phase change in a recording film, and a magneto-optical disk which makes use of a change in the direction of magnetization of perpendicular magnetization film.

Of these types, because the phase change optical disk not only does not require an external magnetic field, but also enables easy overwriting, as well as having the advantage of using the same playback method as a read-only disk, it is expected that this type of disk will become the main type used for such applications as overwritable digital video disks.

In the past, there has been a known type of so-called phase change optical disk, which enabled overwriting and which used a recording film which exhibited a phase changed between crystalline and amorphous phases in response to exposure to light.

In a phase change optical disk, a laser light spot from a high-power laser responsive to the information to be recorded on the recording film was shone thereonto, thereby causing a localized rise in temperature in the recording film, this bringing about a phase change between crystalline and amorphous phases to effect recording by means of changing an optical constant thereof, which can be read as differences in reflected light intensity using a low-power laser beam when performing playback.

For example, in a phase change disk which uses a recording film having a relatively slow crystallization time, the disk is turned and a laser beam is shone onto the recording film formed on the disk, the temperature of the recording film being raised to above the melting point thereof and, after the laser light is passed therethrough, quick cooling is done to record information as an amorphous condition in that part.

When erasing, the recording film temperature is held in a temperature range within which crystallization is possible, this being a range which is above the crystallization temperature and below the melting point, for a long enough time to cause crystallization to progress, thereby causing the crystallization of the recording film.

A known method for doing this that of shining an elliptical laser beam which is elongated in the direction of movement. In the case in which new information is recording as already recorded data is being erased, this being a pseudo-overwriting system using two beams, an elliptical laser beam for the purpose of erasing is positioned as to be shone ahead of the circular recording laser bean.

In a disk which uses an information recording film capable of high-speed crystallization, a single laser beam which is collimated into a circular shape is used.

A known method for doing this is that of changing the power of a laser beam between two levels, thereby causing either crystallization or a change to the amorphous phase.

That is, by shining a laser beam from a laser having sufficient power to raise the temperature of the recording film to above the melting point, the amorphous state is almost totally present when quick cooling is done.

In contrast to this, by shining a laser beam from a laser having power such that the temperature of the recording film is above the crystallization temperature and below the melting point, the part subjected to such light is crystallized.

The recording film of a phase change optical disk is formed as a grown film of a chalcogenide material such as GeSbTe, InSbTe, InSe, InTe, AsTeGe, TeOx-GeSn, TeSeSn, SbSeBi, and BiSeGe or the like, in all cases this film being formed by means of a resistive heating vacuum deposition method, electron beam vacuum deposition method, or by sputtering or the like.

The condition of the recording film immediately after formation of the film represents a type of amorphous state, and in order to form a recording amorphous part thereof by performing recording onto the recording film, it first necessary to perform initialization processing so as to change the overall recording film to the crystallized condition. Then recording is done by changing parts of this crystallized recording film to the amorphous state.

In a phase change optical disk in the past, there has been a method proposed for mark edge recording, in which information is recorded at a recording mark edge.

A disk configuration that is suitable for mark edge recording under the assumption of use at high linear speed was proposed as having a configuration which uses a transmission-type reflective film, and a silicon reflective film in particular, (for example, in Japanese Unexamined Patent Publication (KOKAI) Nos. 4-102243, 8-77596, and 8-124218).

For use as an optical disk medium for use in low linear speed mark edge recording, an example has been proposed which uses a metallic reflective film (for example: Ishida et al, p. 70 of preprints of the Sixth Phase Change Recording Research Symposium, November, 1994).

There is also known a track and groove recording method by which recording is performed in both the depressed and protruding part or tracking guide groove form on the substrate. By using this method, it is in principle possible to achieve a two-fold increase in recording density in the track direction, this enabling the achievement of high-density recording (for example, Ohno et al, p. 114 of Fifth Phase Change Recording Research Symposium, November, 1993).

As described above, the combined use of mark edge recording and track and groove recording is effective as a method of high-density recording. In overwriting phase change recording, using the known type of recording in which an amorphous mark is recorded in a crystallized part having a high reflectivity, when performing mark edge recording of a reflectivity difference playback medium in which there is a large difference in reflectivity between a crystallized part and an amorphous part, because the medium does not have light passing through it, the absorption factor of the crystallized part is quite a bit lower than in the amorphous part, this causing the problem of not being able to suppress distortion of the recorded edge when overwriting.

To solve the above-noted problem, a method of making the difference in reflectivity between the crystalline part and the amorphous part small and setting the optical phase difference therebetween so as to be large has been proposed (for example, in Japanese Unexamined Patent Publication No. 2-73537, Japanese Unexamined Patent Publication No. 2-113451, and Japanese Unexamined Patent Publication No. 7-93804).

When this method is used, it is possible to make the absorption factor of the crystalline part approximately the same as or larger than that of the amorphous part, thereby enabling suppression of the distortion of the recording mark to a small amount when overwriting.

However, in doubled track density recording, because of the necessary to achieve a uniform signal level when performing land and groove playback, and also it is required that the optical phase difference between the crystallized part and the amorphous part should be set at around zero, by merely establishing an optical phase difference and making the absorption factor of the crystalline part the same level as or greater than that of the absorption factor of the amorphous part, the level balance between land playback and groove playback is upset, so that it is not possible to obtain a medium suitable for good recording using a combination of mark edge recording and land and groove recording.

The present invention was made to solve the above-noted problems, and has as an object the provision of a phase change type optical disk that solves the problems of a medium which uses a combination of mark edge recording and land and groove recording, and which is capable of high-density recording while maintaining overwriting characteristics for the prescribed mark edge recording.

SUMMARY OF THE INVENTION

To achieve the above-noted object, the present invention is a phase change type optical disk which makes use of a reversible change in phase between crystalline and amorphous to perform recording, playback, and erasing by means of a change of phase in a recording film caused by subjecting it to laser light.

In this disk, a base protective film, a phase change recording film, an upper protective film, a metallic reflective film, and a protective resin film are sequentially laminated onto a substrate.

Onto the above-noted substrate a helical or concentrically circular shaped guide groove in the shape of a groove and a land is priorly formed for the purpose of laser beam tracking, phase change recording of information being performed in both the groove and land of the above-noted guide groove, the optical phase difference between the reflected laser light from the crystalline condition and the amorphous condition of the above-noted phase change recording film being established so as to be 180 degrees ±5 degrees.

In the present invention, the ratio of the light absorption factor of the phase change recording film when it is in the crystalline condition to that when it is in the amorphous condition is between 0.9 and 1.1.

In the present invention, with a wavelength of the laser light used of $\lambda$, the optical depth of the guide groove that is formed in the substrate is established so as to be from $\lambda/9$ to $\lambda/6$.

In the present invention the wavelength of the laser light used is in the range from 635 nm to 650 nm, and the depth of the guide groove that is formed in the substrate is established so as to be from 40 nm to 70 nm.

In the present invention, on a substrate made of polycarbonate, a base protective film made of $ZnS—SiO_2$, a phase change recording film having GeSbTe as is main component, an upper protective film made of $ZnS—SiO_2$, a metallic reflective film having aluminum as its main component, and a protective resin film which is cured by ultraviolet light are sequentially formed.

In addition, in the present invention, the metallic reflective film has aluminum as its main component, and has the amount of added titanium established so as to be from 0% to 2.0% by weight.

In the present invention, by making refinements of the constitution of the phase change type optical disk, the optical phase of the reflected light which accompanies an optical change in the recording film changes. Because of this, the it is possible to obtain a playback signal without making the difference in reflectivities of the crystalline parts and amorphous parts large.

Thus, it is easy to make the absorption factor at the recording film in the case in which the recording film is in the crystalline condition large, and this can be made either the same level as or larger than that in the case of an amorphous part thereof, thereby achieving good overwriting characteristics with mark edge recording.

In land and groove double-track recording, the optical phase difference between the reflected laser light at a crystalline condition and amorphous condition part of the land is established so as to be 180 degrees ±5 degrees.

At such an optical phase difference, when seen from reflected light, the groove region of a groove during playback and land region of the groove during playback are optically equivalent.

For this reason, it is substantially the same as the case in which the optical phase difference between the reflected laser light from the crystalline part of the recording film and the reflected laser light from the amorphous part of the recording film is zero, this making it possible to achieve consistency in the signal levels between land playback and groove playback.

As a result, it is possible to perform double track density recording and mark edge recording.

DETAILED DESCRIPTION OF THE PREFERRED EMBODIMENTS

Embodiments of present invention are described below, with reference being made to the relevant accompanying drawings.

Figure 1:
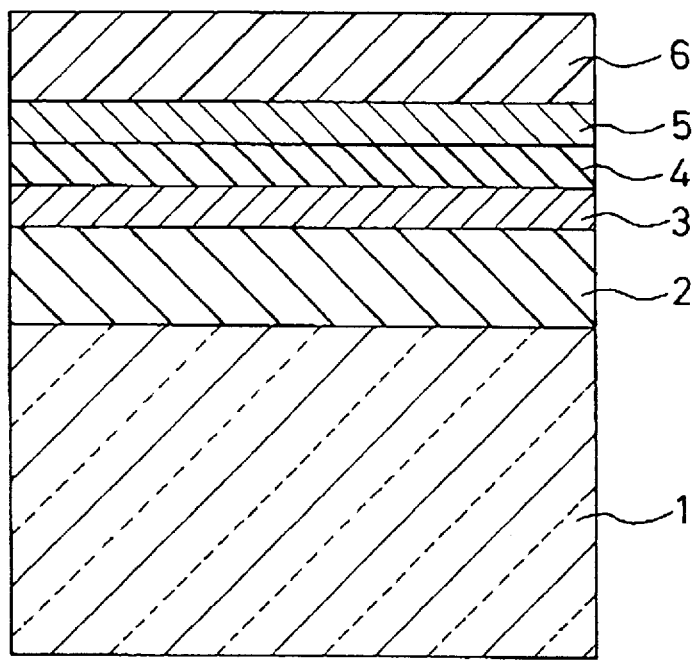
FIG. 1 is a cross-sectional view of an embodiment of a phase change type optical disk according to the present invention.

FIG. 1 is a cross-sectional view which shows the configuration of a phase change type optical disk according to the present invention. In this drawing, a phase change type optical disk 10 has a substrate 1, onto the surface of which are sequentially formed a base protective film 2, a phase change recording film 3, an upper protective film 4, a metallic reflective film 5, and a protective resin film 6.

Onto the above-noted substrate 1 a helical or concentrically circular shaped guide groove (not shown in the drawing) in the shape of a groove and a land is priorly formed for the purpose of laser beam tracking, phase change recording of information being performed in both the groove and land of the above-noted guide groove.

A disc-shaped glass or plastic is used as the substrate 1. As a material for the base protective film 2 and the upper protective film 4, $SiO_2$, $Si_3N_4$, AlN, $TiO_2$, ZnS, ZnS—$SiO_2$ or the like is used. As the phase change recording film 3, a chalcogenide material such as GeSbTe, InsbTe, InSe, InTe, AsTeGe, TeOx-GeSn, TeSeSn, SbSeBi, and BiSeGe or the like is used. As the metallic reflective film 5, a metallic alloy film is used.

For example, it is possible to use aluminum, Al—Ti, Al—Si, Al—Ta, Al—Cu, Al—Ni, Al—Co or the like. A UV-cured resin is generally used as the protective resin film 6.

While a single disk can of course be used, it is possible to adhere together disks having the same specifications, using an adhesive, thereby enabling the creating of a double-sided disk. To increase the rigidity of the disk, it is allowable to adhere to one substrate another substrate onto which no recording film is formed, and to use the resulting disk as a single-sided disk.

Figure 2:
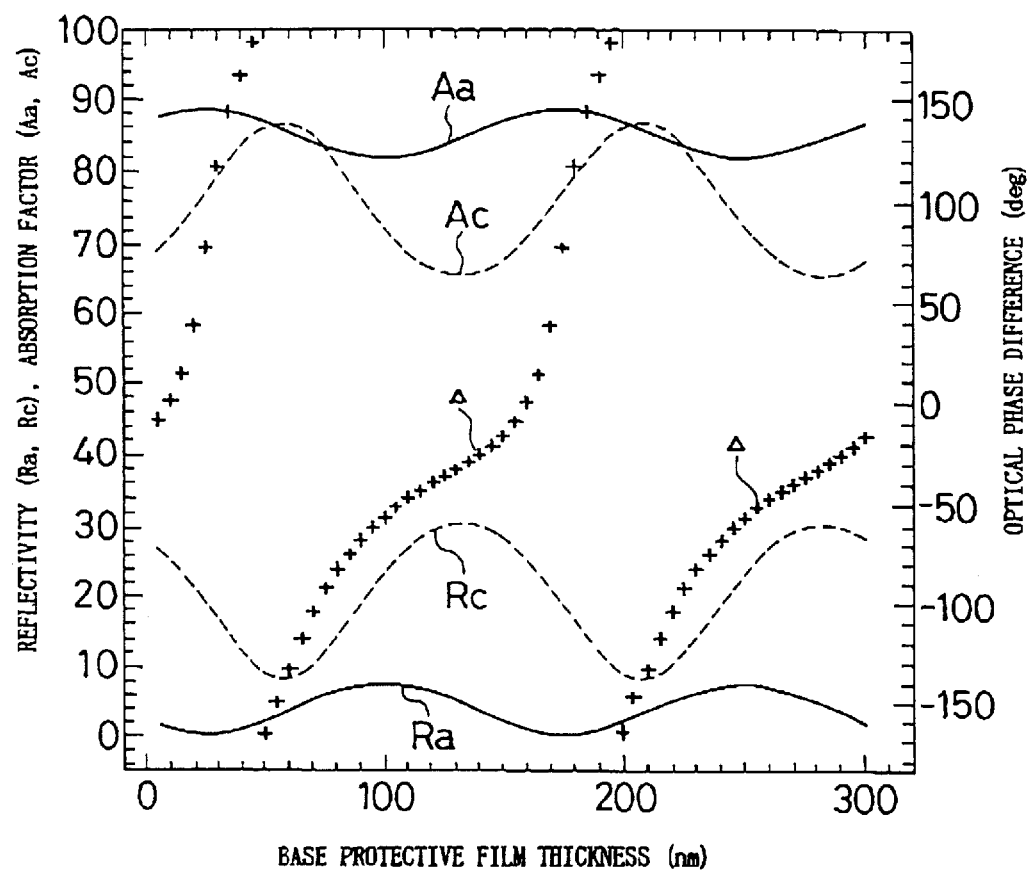
FIG. 2 is a drawing which shows the optical characteristics of another phase change type optical disk according to the present invention.

FIG. 2 is a drawing which shows the case in which, with a wavelength of 640 nm, for a polycarbonate substrate 1 onto which a base protective film 2 of ZnS—$SiO_2$ having a thickness of 5 nm to 300 nm, a $Ge_2Sb_2Te_5$ phase change recording film 3 of 12 nm thickness, a ZnS—$SiO_2$ upper protective film 4 of 25 nm thickness, an Al—Ti metallic reflective film 5 of 100 nm thickness, and a protective film resin film 6 of 10 μm and having an index of refraction of 1.5 are sequentially formed, the reflectivities Re and Ra for the crystalline and amorphous conditions of the optical disk, and the corresponding absorption factors Ac an Aa and optical phase difference Δ are determined.

In the regions in which the base protective film thickness is 60 nm and 200 nm, the optical phase difference Δ is 180 degrees, at which point the absorption factor of the crystalline condition of the recording film 3 is either the same level as or greater than the absorption factor of the amorphous condition of the recording film 3.

If the ratio of the light absorption factor of the phase change recording film 3 when it is in the crystalline condition to that when it is in the amorphous condition is in the range 0.9 to 1.1, because the rise in temperature of the crystalline condition and amorphous condition when performing overwriting can be made small, it is possible to perform good marls edge recording.

Figure 3:
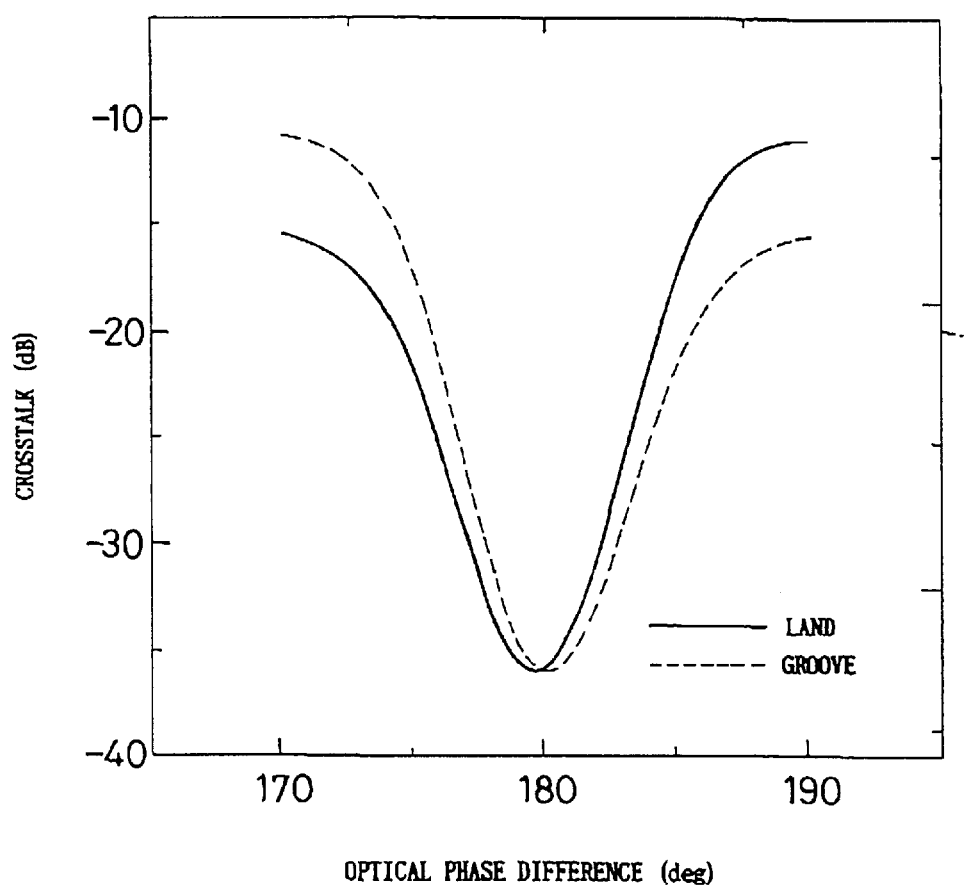
FIG. 3 is a drawing which shows the crosstalk characteristics of phase change type optical disk according to the present invention.

FIG. 3 is shows the results of determining the crosstalk characteristics with respect to the optical phase difference of the reflected light from the phase change recording film, for the case in which the optical depth of the guide groove is λ/6.3.

If we assume that the allowable level of crosstalk is −26 dB, it is necessary to suppress the optical phase difference to 180 degrees ±5 degrees.

In the first embodiment of the present invention, to achieve the same type of configuration as shown in FIG. 1, a base protective film 2, a phase change recording film 3, an upper protective film 4, a metallic reflective film 5, and a protective resin 6 were sequentially formed onto the substrate 1.

As the substrate 1, a polycarbonate substrate having a diameter of 120 mm was used, this having a substrate thickness of 0.6 mm, a track pitch of 1.2 μm, a land width of 0.6 μm, a groove width of 0.6 μm, and a groove depth of 55 nm.

Onto this substrate 1, a sputtering method was used to form a base protective film 2 (of thickness 200 nm) made of ZnS—$SiO_2$, a $Ge_2Sb_2Te_5$ phase change recording film 3 (of thickness 12 nm), a ZnS—$SiO_2$ upper protective film 4 (of thickness 25 nm), and an Al—Ti (with titanium of 1.0% by weight) were sequentially formed. Then, UV-cured protective resin 6 (SD301, made by Dai Nippon Ink, thickness 10 μm) was applied by spin coating, this being cured by ultraviolet light.

Then, to verify the effect of the present invention, an optical head which uses a semiconductor laser having a wavelength of 640 nm was used to try recording onto an the optical disk. By first exposing this optical disk beforehand to DC laser light from of a given power, the overall recording film was made crystalline to initialize the disk.

The specifications of the optical head used in recording were such that the numerical aperture NA of the collimating lens was 0.60 and the maximum output power was 15 mW.

The optical disk was driven at a linear speed of 6.0 meter/second and a signal A having a mark length of 0.40 μm and a signal B having a mark length of 0.50 μm were alternately overwritten on the land part and groove part of the disk. Jitter, which is an important means of evaluating mark edge recording, was within 3.0 ns after 10 times overwrite for both signal A and signal B, thereby providing verification that it is possible to perform good mark edge recording. The land-to-groove crosstalk was −30 dB.

In addition, the difference in signal output level between land playback and groove playback was within 1.0 dB, thereby providing verification that the optical disk is sufficiently usable for both mark edge recording and land and groove track recording.

Turning to the second embodiment of the present invention, the configuration of this embodiment is similar to that of the first embodiment, an optical disk being fabricated with a pure aluminum metallic reflective disk 5.

Evaluation was performed of this disk at a linear speed of 4.0 meters/second. A signal A having a mark length of 0.40 μm and a signal B having a mark length of 0.50 μm were alternately overwritten on the land part and groove part of the disk.

The jitter after overwriting was within 4.0 ns for both signal A and signal B, thereby providing verification that it is possible to perform good mark edge recording.

The land-to-groove crosstalk was −26 dB. In addition, the difference in signal output level between land playback and groove playback was within 0.8 dB, thereby providing verification that the optical disk is sufficiently usable for both mark edge recording and land and groove track recording.

Turning to the third embodiment of the present invention, the configuration of this embodiment is similar to that of the first embodiment, an optical disk being fabricated with an Al—Ti metallic reflective disk 5 having a titanium content of 2.0% by weight.

Evaluation was performed of this disk at a linear speed of 8.0 meters/second. A signal A having a mark length of 0.40

μm and a signal B having a mark length of 0.50 μm were alternately overwritten on the land part and groove part of the disk.

The jitter after overwriting was within 2.5 ns for both signal A and signal B, thereby providing verification that it is possible to perform good mark edge recording.

The land-to-groove crosstalk was −32 dB.

In addition, the difference in signal output level between land playback and groove playback was within 1.1 dB, thereby providing verification that the optical disk is sufficiently usable for both mark edge recording and land and groove track recording.

Turning to the fourth embodiment of the present invention, the configuration of this embodiment is similar to that of the first embodiment, an optical disk being fabricated with substrate having a groove depth of 40 nm.

Evaluation was performed of this disk at a linear speed of 6.0 meters/second. A signal A having a mark length of 0.40 μm and a signal B having a mark length of 0.50 μm were alternately overwritten on the land part and groove part of the disk.

The jitter after overwriting was within 3.0 ns for both signal A and signal B, thereby providing verification that it is possible to perform good mark edge recording.

The land-to-groove crosstalk was −26 dB. In addition, the difference in signal output level between land playback and groove playback was within 0.8 dB, thereby providing verification that the optical disk is sufficiently usable for both mark edge recording and land and groove track recording.

FIRST COMPARISON EXAMPLE

Using the same configuration as the first embodiment, a disk was fabricated with a substrate 1 having a groove depth of 35 nm. Evaluation was performed of this disk at a linear speed of 6.0 meters/second.

A signal A having a mark length of 0.40 μm and a signal B having a mark length of 0.50 μm were alternately overwritten on the land part and groove part of the disk.

The jitter after ten holds of overwriting was within 3.0 ns, thereby providing verification that it is possible to perform good mark edge recording. The land-to-groove crosstalk was −20 dB. In addition, the difference in signal output level between land playback and groove playback increased to 1.8 dB.

Turning to the fifth embodiment, the configuration of this embodiment is similar to that of the first embodiment, an optical disk being fabricated with substrate 1 having a groove depth of 70 nm.

Evaluation was performed of this disk at a linear speed of 6.0 meters/second.

A signal A having a mark length of 0.40 μm and a signal B having a mark length of 0.50 μm were alternately overwritten on the land part and groove part of the disk.

The jitter after ten holds of overwriting was within 3.0 ns for both signal A and signal B, thereby providing verification that it is possible to perform good mark edge recording. The land-to-groove crosstalk was −27 dB.

In addition, the difference in signal output level between land playback and groove playback was within 0.9 μdB, thereby providing verification that the optical disk is sufficiently usable for both mark edge recording and land and groove track recording.

SECOND COMPARISON EXAMPLE

Using the same configuration as the first embodiment, a disk was fabricated with a substrate 1 having a groove depth of 75 nm. Evaluation was performed of this disk at a linear speed of 6.0 meters/second.

A signal A having a mark length of 0.40 μm and a signal B having a mark length of 0.50 μm were alternately overwritten on the land part and groove part of the disk.

The jitter after ten holds of overwriting was within 3.0 ns, thereby providing verification that it is possible to perform good mark edge recording. However, the land-to-groove crosstalk was −18 dB. In addition, the difference in signal output level between land playback and groove playback increased to 1.8 dB.

Turning to the sixth embodiment, an optical disk equivalent to the first embodiment onto which signals are recorded in the lands and grooves was played back using a dedicated playback head having a wavelength of 635 nm.

The specifications of the optical head used were such that the numerical aperture NA of the collimating lens was 0.60 and the maximum playback power was 3.0 mW.

The disk was rotated at a linear speed of 6.0 meters/second and a signal A having a mark length of 0.40 μm and a signal B having a mark length of 0.50 μm were played back with a playback power of 1.0 mW.

The jitter was within 2.8 ns for both signal A and signal B, providing verification that good edge mark signal playback is possible.

The land-to-groove crosstalk was −31 dB. Additionally, the difference in the signal output between land playback and groove playback was within 0.8 dB, providing verification that the optical disk is sufficiently usable for both mark edge recording and land and groove recording.

Turning to the seventh embodiment, an optical disk equivalent to the first embodiment was played back with an optical head having a wavelength of 650 nm.

The specifications of the optical head used were such that the numerical aperture NA of the collimating lens was 0.60 and the maximum light power was 19 mW This optical disk was rotated at a linear speed of 6.0 meters/second, and a signal A having a mark length of 0.40 mm and a signal B having a mark length of 0.50 μm were alternately overwritten on the land part and groove part of the disk.

Jitter, which is an important means of evaluating mark edge recording was within 3.2 ns after overwriting for both signal A and signal B, thereby providing verification that it is possible to perform good mark edge recording.

The land-to-groove crosstalk was −28 dB. In addition, the difference in signal output level between land playback and groove playback was within 0.9 dB, thereby providing verification that the optical disk is sufficiently usable for both mark edge recording and land and groove track recording.

In the another aspect of the present invention, a method for recording, playbacking or erasing optical information with utilizing an optical disk is also provided and in that a method for recording, playbacking or erasing optical information with utilizing an optical disk which makes use of a reversible change in phase between crystalline and amorphous, and by means of a change in phase in a recording film caused by subjecting it to laser light, and wherein said optical disk comprising a substrate, onto which are sequentially formed a base protective film, a phase change recording film, an upper protective film, a metallic reflective film, and a protective resin, and further wherein a helical or concentrically circular shaped guide groove in the shape of a groove and a land being priorly formed onto said substrate for the purpose of laser beam tracking, phase change recording of information being performed in both said groove and said land of said guide groove, said method is performed by setting an optical phase difference between reflected laser light from a crystalline condition and an amorphous condition of said phase change recording film, at around 180 degrees ±5 degrees.

It will be apparent to someone skilled in the art that present invention is not limited to the configuration as noted above, and can be applied to a wide range of phase change optical disks for both mark edge recording and land and groove recording for the purpose of achieving high-density optical disk recording.

Because in a phase change optical disk as described in detail above the optical phase difference between the reflected laser light from the crystalline and amorphous parts of the phase change recording film is established so as to be 180 degrees ±5 degrees, it is possible to have the absorption factor in the crystalline condition be as great as or greater than the absorption factor in the amorphous condition.

Thus, it is easy to make the absorption factor at the recording film in the case in which the recording film is in the crystalline condition large, and also possible to perform high-density recording while maintaining overwriting characteristics for the prescribed mark edge recording, thereby enabling the achievement of high-density recording as was not possible in the past.

Additionally, because the ratio of the light absorption factor of the phase change recording film 3 when it is in the crystalline condition to that when it is in the amorphous condition is established so as to be in the range 0.9 to 1.1, it is possible to make the difference in the rise in temperature of the crystalline condition and amorphous condition when performing overwriting small.

What is claimed is:

1. A phase change type optical disk which makes use of a reversible change in phase between crystalline and amorphous to perform recording, playback, and erasing by means of a change in phase in a recording film caused by subjecting it to laser light, said optical disk comprising:

a substrate, onto which are sequentially formed a base protective film, a phase change recording film, an upper protective film, a metallic reflective film, and a protective resin, a helical or concentrically circular shaped guide groove in the shape of a groove and a land being priorly formed onto said substrate for the purpose of laser beam tracking, phase change recording of information being performed in both said groove and said land of said guide groove, an optical phase difference between reflected laser light from a crystalline condition and an amorphous condition of said phase change recording film being established as to be 180 degrees ±5 degrees.

2. A phase change type optical disk according to claim 1, wherein a ratio of a light absorption factor of said phase change recording film when it is in a crystalline condition to that when it is in an amorphous condition is between 0.9 and 1.1.

3. A phase change type optical disk according to claim 1, wherein if a wavelength of said laser light used is $\lambda$, the optical depth of said guide groove that is formed in said substrate is established so as to be from $\lambda/9$ to $\lambda/6$.

4. A phase change type optical disk according to claim 3, wherein a wavelength of said laser which is used is in the range from 635 nm to 650 nm, and the depth of said guide groove that is formed in said substrate is established so as to be from 40 nm to 70 nm.

5. A phase change type optical disk according to any one of claim 1 through claim 3, wherein on a substrate made of polycarbonate, a base protective film made of $ZnS$—$SiO_2$, a phase change recording film having GeSbTe as is main component, an upper protective film made of $ZnS$—$SiO_2$, a metallic reflective film having aluminum as its main component, and a protective resin film which is cured by ultraviolet light are sequentially formed.

6. A phase change type optical disk according to claim 5, wherein said metallic reflective film has aluminum as its main component, and has an amount of added titanium established so as to be from 0% to 2.0% by weight.

7. A method for recording, playbacking or erasing optical information with utilizing an optical disk which makes use of a reversible change in phase between crystalline and amorphous, and by means of a change in phase in a recording film caused by subjecting it to laser light, and wherein said optical disk comprising a substrate, onto which are sequentially formed a base protective film, a phase change recording film, an upper protective film, a metallic reflective film, and a protective resin, and further wherein a helical or concentrically circular shaped guide groove in the shape of a groove and a land being priorly formed onto said substrate for the purpose of laser beam tracking, phase change recording of information being performed in both said groove and said land of said guide groove, said method is performed by setting an optical phase difference between reflected laser light from a crystalline condition and an amorphous condition of said phase change recording film, at around 180 degrees ±5 degrees.

8. A method according to claim 7, wherein a ratio of a light absorption factor of said phase change recording film when it is in a crystalline condition to that when it is in an amorphous condition is between 0.9 and 1.1.

9. A method according to claim 7, wherein if a wavelength of said laser light used is $\lambda$, the optical depth of said guide groove that is formed in said substrate is established so as to be from $\lambda/9$ to $\lambda/6$.

10. A method according to claim 7, wherein a wavelength of said laser which is used is in the range from 635 nm to 650 nm, and the depth of said guide groove that is formed in said substrate is established so as to be from 40 nm to 70 nm.

11. A method according to claim 7, wherein on a substrate made of polycarbonate, a base protective film made of $ZnS$—$SiO_2$, a phase change recordings film having GeSbTe as is main component, an upper protective film made of $ZnS$—$SiO_2$, a metallic reflective film having aluminum as its main component, and a protective resin film which is cured by ultraviolet light are sequentially formed.

12. A method according to claim 7, wherein said metallic reflective film has aluminum as its main component, and has an amount of added titanium established so as to be from 0% to 2.0% by weight.

* * * * *